US007995062B2

(12) United States Patent  
Zhang

(10) Patent No.: US 7,995,062 B2  
(45) Date of Patent: *Aug. 9, 2011

(54) METHODS FOR UTILIZING HUMAN PERCEPTUAL SYSTEMS FOR PROCESSING EVENT LOG DATA

(75) Inventor: Xiaoming Zhang, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 761 days.

This patent is subject to a terminal disclaimer.

(21) Appl. No.: 12/041,874

(22) Filed: Mar. 4, 2008

(65) Prior Publication Data

US 2009/0228498 A1 Sep. 10, 2009

(51) Int. Cl.
*G06T 11/20* (2006.01)

(52) U.S. Cl. ....................................... 345/440

(58) Field of Classification Search .................. None
See application file for complete search history.

(56) References Cited

U.S. PATENT DOCUMENTS

| | | | |
|---|---|---|---|
| 4,713,669 A | 12/1987 | Shuch | |
| 4,777,474 A | 10/1988 | Clayton | |
| 4,858,152 A | 8/1989 | Estes | |
| 5,862,381 A | 1/1999 | Advani et al. | |
| 6,057,839 A | 5/2000 | Advani et al. | |
| 7,605,589 B2 | 10/2009 | Weiger et al. | |
| 7,653,899 B1 * | 1/2010 | Lindahl et al. | 717/128 |
| 2005/0001839 A1 * | 1/2005 | Davis et al. | 345/440 |
| 2006/0259827 A1 | 11/2006 | Sohm et al. | |

OTHER PUBLICATIONS

Audio Emergency Warning Systems, [onlline]; [retrieved on Mar. 3, 2008]; retrieved from the Internet http://www.magalabs.com/audiofacts1.htm.
AMS-2000 Altitude Alert System (8900), [online]; [retrieved on Mar. 4, 2008]; retrieved from the Internet http://www.edmo.com/index.php?module=products&func=display&prod_id=17093&disp= . . . .
3-D Audio Traffic Alert and Collision Avoidance System, [online]; [retrieved on Mar. 3, 2008]; retrieved from the Internet http://human-factors.arc.nasa.gov/ihh/spatial/research/Begault_3d_collision_avoidance.html.

(Continued)

*Primary Examiner* — Andrew Wang
*Assistant Examiner* — David H Chu
(74) *Attorney, Agent, or Firm* — Cantor Colburn LLP; Andre Gibbs

(57) ABSTRACT

A method is provided for utilizing the human perceptual system by providing a spectrum of event log data for viewing. Event log data is received. Events of the event log data are mapped to an x-axis of a spectrum based on time, where the events of the event log data correspond to a time slot on the x-axis. Categories for the events are mapped to a y-axis of the spectrum, where the y-axis is a frequency axis, and where each of the categories respectively corresponds to a frequency of the multiple frequencies. Strength of events are mapped to a z-axis of the spectrum, where the z-axis is a magnitude axis, and where a magnitude value reflects the significance of the events happened at a particular time slot in a particular category. The magnitude of events (z-axis) of the event log data may be further mapped to a line thickness of the spectrum for the multiple frequencies. The spectrogram of the event log data is presented in a two-dimensional graphical format in time, frequency, and magnitude for observation by a user.

4 Claims, 4 Drawing Sheets

OTHER PUBLICATIONS

Audio Dementia, [online]; [retrieved on Mar. 3, 2008]; retrieved from the Internet http://www.audiodementia.com/ad.html.

Managing trace data volume through a heuristical clustering process based on event execution frequency, [online]; [retrieved on Mar. 5, 2008]; retrieved from the Internet, http://ieeexplore.ieee.org/xpl/absprintf.jsp?arnumber=1281435&page=FREE.

I hear a computer voice, [online]; [retrieved on Mar. 5, 2008]; retrieved from the Internet, http://usatoday.printthis.clickability.com/pt/cpt?action=cpt&title=USATODAY.com+-+%2 . . . .

Ground proximity warning system, [online]; [retrieved on Mar. 5, 2008]; retrieved from the Internet, http://en.wikipedia.org/wiki/Ground_proximity_warning_system.

* cited by examiner

METHODS FOR UTILIZING HUMAN PERCEPTUAL SYSTEMS FOR PROCESSING EVENT LOG DATA

REFERENCE TO RELATED APPLICATIONS

This application contains subject matter which is related to the subject matter of the following co-pending applications, each of which is assigned to the same assignee as this application, International Business Machines Corporation of Armonk, N.Y. Each of the below listed applications is hereby incorporated herein by reference in its entirety: IBM Docket No. GB920070146US1, filed Mar. 4, 2008.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field of the Invention

This invention relates to methods for processing volumes of data, and particularly to providing data in a spectrogram for analysis.

2. Description of Background

Software execution frequently generates a large amount of event log data, such as execution trace data. Such data is frequently used for monitoring execution status of various programs and/or processes or for identifying execution problems. Analysis of this data normally requires expert knowledge in the computing field, and particularly in writing software. Each separate event may not mean much individually; however, put together in a context, the events can be very revealing. Those skilled in the art appreciate that the production and use of trace data is well known in the art.

The problem, however, is the sheer amount of raw data that is generated and collected, which frequently makes human digest difficult. Also, it is difficult to code the expert knowledge required to analyze such data into a computer program. Unless one knows exactly, human analysis of data tends to be a time consuming task. It would be beneficial to provide data in a format that is more manageable.

SUMMARY

In accordance with exemplary embodiments, a method is provided for utilizing the human perceptual system by providing a spectrum of event log data for viewing. Event log data is received. Events of the event log data are mapped to an x-axis of a spectrum based on time, where the events of the event log data correspond to a time slot on the x-axis. Categories for the events are mapped to a y-axis of the spectrum, where the y-axis is a frequency axis, and where each of the categories respectively corresponds to a frequency of the multiple frequencies. Strength of events are mapped to a z-axis of the spectrum, where the z-axis is a magnitude axis, and where a magnitude value reflects the significance of the events happened at a particular time slot in a particular category. The magnitude of events (z-axis) of the event log data may be further mapped to a line thickness of the spectrum for the multiple frequencies. The spectrogram of the event log data is presented in a two-dimensional graphical format in time, frequency, and magnitude for observation by a user.

In accordance with exemplary embodiments, a method is provided for utilizing the human perceptual system by providing a spectrum of event log data for listening. Event log data is received. Events of the event log data are mapped to an x-axis of a spectrum based on time, where events of the event log data correspond to a time slot on the x-axis. Categories for the events are mapped to a y-axis of the spectrum, where the y-axis is a frequency axis, and where each of the categories respectively corresponds to a frequency of the multiple frequencies. Strength of events are mapped to a z-axis of the spectrum, where the z-axis is a magnitude axis, and where a magnitude value reflects the significance of the events happened at a particular time slot in a particular category. The time from the x-axis, the multiple frequencies from the y-axis, and the magnitude from the z-axis of the spectrum are translated into sound.

System and computer program products corresponding to the above-summarized methods are also described and claimed herein.

Additional features through the techniques of the exemplary embodiments are described in detail herein and are considered a part of the claimed invention. For a better understanding of features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features are apparent from the following detailed description taken in conjunction with the accompanying drawings in which:

The detailed description explains exemplary embodiments of the invention, together with advantages and features, by way of example with reference to the drawings.

DETAILED DESCRIPTION OF EXEMPLARY EMBODIMENTS

Exemplary embodiments provide techniques for utilizing human perceptual systems for processing event log data.

Figure 1:
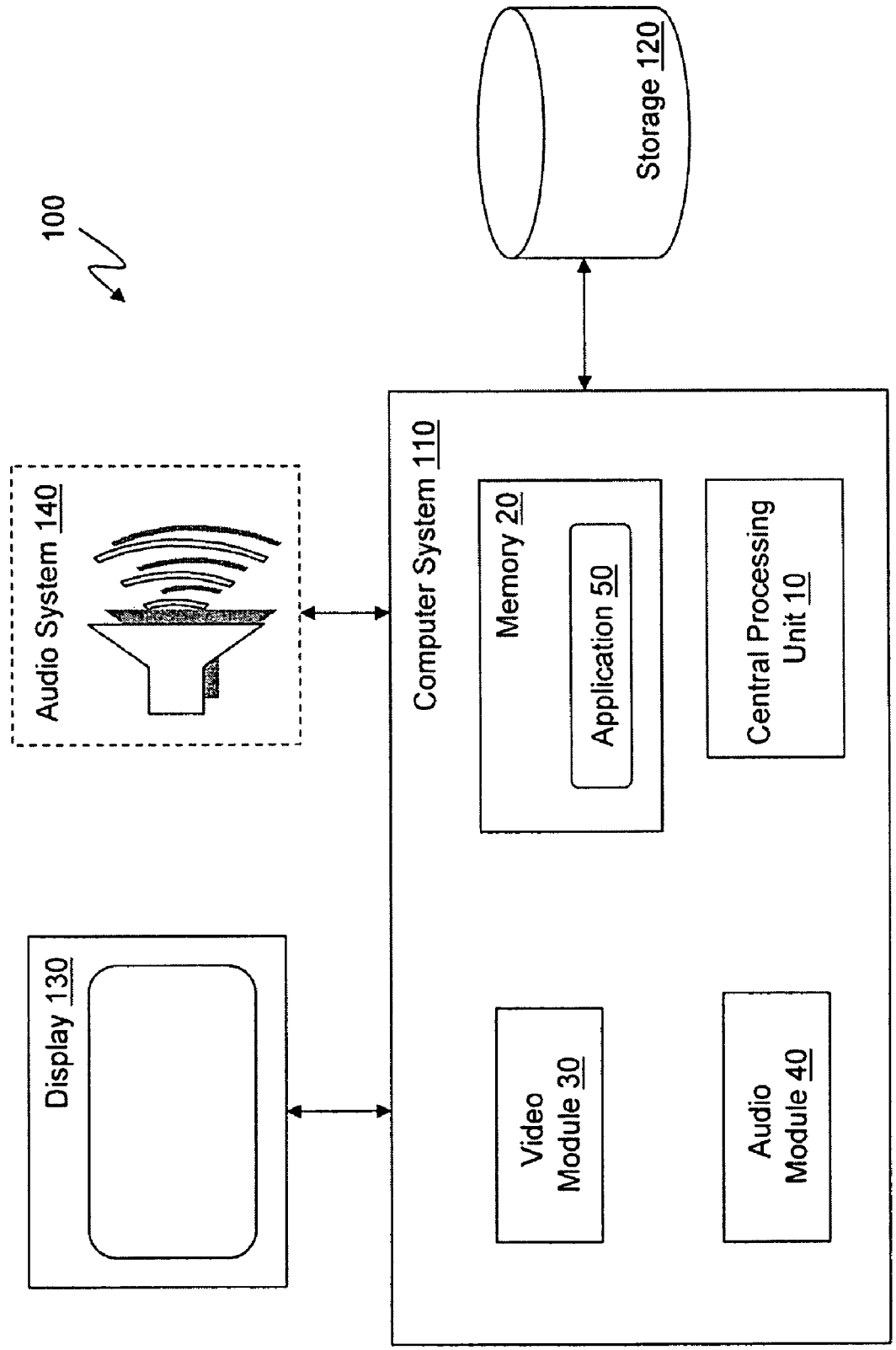
FIG. 1 illustrates a block diagram of a system in accordance with exemplary embodiments.

FIG. 1 illustrates a block diagram of a system 100 in accordance with exemplary embodiments. The system 100 includes a computer system 110 operatively connected to a storage 120. The storage 120 may contain large amounts of different types of data. For example, the storage 120 may contain event log data, e.g., trace data, that corresponds to the execution of a particular system. The computer system 110 may also be operatively connected to the display 130 and the audio system 140.

The computer system 110 includes one or more central processor units (CPU) 10, memory 20, a video module 30, an audio module 40, and one or more applications 50 communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The CPU 10 is a hardware device for executing software that can be stored in the memory 20. The CPU 10 can be virtually any custom made or commercially available processor, and the CPU 10 may be a semiconductor based microprocessor (in the form of a microchip) or a macroprocessor.

The memory 20 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 20 may incorporate electronic, magnetic, optical, and/or other types of storage media. Note that the memory 20 can have a distributed architecture, where various components are situated remote from one another, but can be accessed by the central processing unit 10.

The software in the memory 20 may include one or more separate programs, each of which comprises an ordered listing of executable instructions for implementing logical functions. The software in the memory 20 may include a suitable operating system (O/S), compiler, source code, and application (which may be one or more applications) such as the application 50 of exemplary embodiments. As illustrated, the application 50 comprises numerous functional components for implementing the features and operations of the exemplary embodiments.

The video module 30 comprises one or more software and/or hardware components responsible for producing the visual output on the display 130 from the computer system 110. The video module 30 may comprise a video card, also referred to as a graphics accelerator card, display adapter, graphics card, etc. If the video card is integrated in the motherboard, it may use the computer RAM memory (lower throughput). If it is not integrated, the video card may have its own video memory, which is called video RAM or VRAM. The video module 30 may include a video BIOS or a firmware chip that contains the basic program that governs the video module's 30 operations and provides the instructions that allow the computer and software to interface with the video module 30. The video module 30 may include a random access memory digital-to-analog converter (RAMDAC), which takes responsibility for turning the digital signals produced by the computer processor into an analog signal which can be understood by a computer display, e.g., that is not is analog. The video module 30 may include a graphics processing unit (GPU) that may be a dedicated graphics microprocessor optimized for floating point calculations which are fundamental to 3D graphics.

The audio module 30 comprises one or more software and/or hardware components responsible for producing an audio output on the audio system 140 from the computer system 110. The audio module 30 may comprise a sound card that is able to translate analog and digital information. The sound card may include an analog-to-digital converter (ADC), a digital-to-analog converter (DAC), an ISA or PCI interface to connect the card to the motherboard, and input and output connections. The audio module 30 may also include a digital signal processor (DSP) that is a specialized microprocessor. The DSP can perform various calculations for analog and digital conversion and can process multiple sounds or channels, simultaneously.

Exemplary embodiments may be implemented using the system 100 or any suitable system. Exemplary embodiments provide a framework to pre-process event log data so that the information contained in the event log data can be identified more easily by the human visual and/or auditory system. The human visual and/or auditory system has its own unique significant data processing capabilities.

For example, it is generally very difficult for a human to recognize the speech of a person from a speech electronic waveform. However, a trained speech expert can perform speech recognition by reading the corresponding spectrogram of the person. This is possible because a spectrogram retains the critical spectral domain information, a spectrogram is displayed in a two-dimensional (2D) format (e.g., frequency vs. time) that makes it much easier for the human visual system to identify the context of various events displayed, and the human visual system has a very powerful 2D image processing capability, which is presumably parallel.

A spectrogram is the result of calculating the frequency spectrum of windowed frames of a compound signal. In some cases, a spectrogram may be a three-dimensional plot of the energy of the frequency content of a signal as it changes over time. In the most usual format, the horizontal axis represents time, the vertical axis is frequency, and the intensity of each point in the image represents amplitude of a particular frequency at a particular time. Often the diagram of a spectrogram is reduced to two-dimensions by indicating the intensity with thicker lines, more intense colors, or grey values.

Similarly, the human auditory system has its own unique processing power, which is exploited in exemplary embodiments. For example, it is not unusual to seen an expert identify a problem in a mechanical system by listening to the noise the mechanical system generates. The human auditory system is capable of focusing on clues embedded in noise. Other possibly useful perceptual characteristics of the human visual and/or auditory system may include the ability to identify sudden changes.

In accordance with exemplary embodiments, the event log data is presented in a suitable format (e.g., using a pseudo spectrum), such that the human visual and/or auditory data processing capabilities can be effectively exploited. For example, the pseudo spectrum may be utilized for a quick identification of the overall running status of a software system or may be utilized for an initial guess of problematic areas in accordance with exemplary embodiments.

An event in an event log may have primarily two features, namely the time it happened and what happened (which may also indicate significance). Exemplary embodiments represent sequential events of event log data as a pseudo spectrum by mapping what happened in the event log onto the pseudo frequency axis. Such a spectrum can by displayed for human visual inspection or listening.

In accordance with exemplary embodiments, the application 50 may incorporate the functions of a sonograph and be used to create a pseudo spectrum of event log data contained in the storage 120. The event log data in the pseudo spectrogram can be viewed by a user on the display 130 via the video module 30 in accordance with exemplary embodiments. Also, the event log data in the spectrum can be listened to on the audio system 140 via the audio module 40 in accordance with exemplary embodiments.

In accordance with exemplary embodiments, the technique may use a "pseudo" spectrum to provide a pre-processing framework designed to assist human initial identification of overall status/problems. In accordance with exemplary embodiments, time events of the event log data are windowed. Although event log data records an exact event order, such a recorded order may not always be meaningful as is for two reasons. The order of the events in the event log data may be accidental and certain events of the event log data may not be important for a high level observation. Exemplary embodiments group events happened within a time window into the same time slot via the application 50, provided that the window size is small enough. This process allows the application 50 to map event time onto the pseudo time axis of a spectrum.

In exemplary embodiments, mapping what happened via application 50 may be a straightforward process that includes assigning an individual event to a predetermined pseudo frequency. The important thing is to keep in mind that such mapping is appropriate for the targeted human perceptual system. As a non-limiting example, it may be better to map an error to a high pseudo frequency where the human auditory system is more sensitive. For example, error events in a trace log usually have specific event identifications that can be recognized. Another non-limiting example may be that events of the same nature should be mapped onto the same frequency band to assist human event generalization. Also, as a non-limiting example, it may also be beneficial to code frequency intensity into a pseudo spectrum via the application 50 to assist the human perceptual systems in recognizing important events. Moreover, the system 100 provides a way to take massive incoherent data and process the data in accordance with exemplary embodiments.

The source of the data for the process may not only be event log files (e.g., contained in the storage 120) but also data collected on-the-fly, which makes immediate, quick spotting of problems possible and reduces the amount of data storage.

Furthermore, user training may be performed before observing the pseudo spectrum in accordance with exemplary embodiments. User training may include reading, observing, and/or listening to pre-recorded samples of pseudo spectrum. As a non-limiting example, sound generated from pre-recorded samples of pseudo spectrum of problematic program executions can be played to users so that similar indicative clues can be quickly caught by the user in the future.

Figure 2:
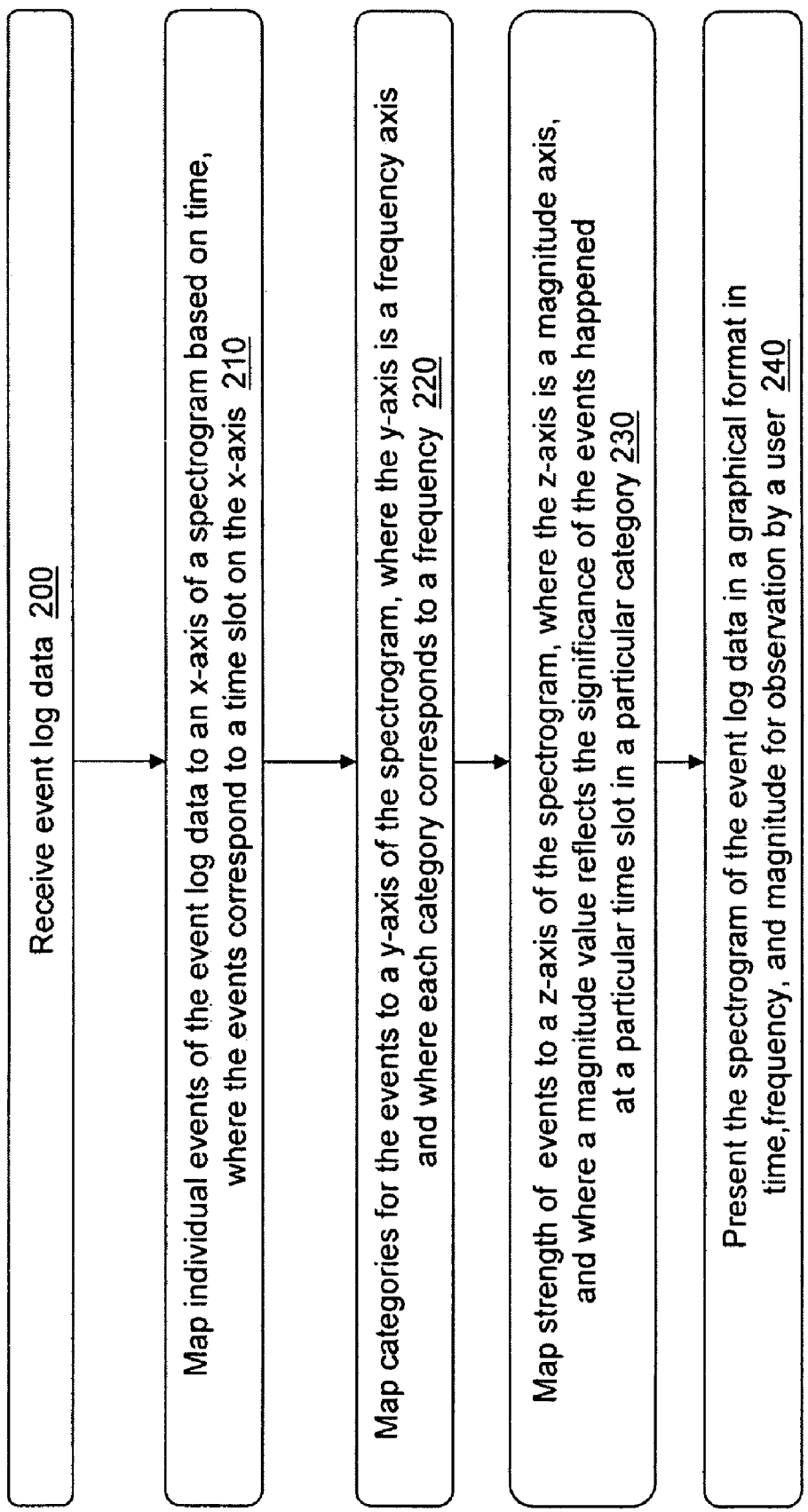
FIG. 2 illustrates a method for mapping trace data into a spectrogram in accordance with exemplary embodiments.

FIG. 2 illustrates a method for mapping trace data into a spectrogram in accordance with exemplary embodiments.

The application 50 may retrieve and/or receive event log data from the storage 120 at 200. The time for events of the event log data is mapped to an x-axis (time) of a pseudo spectrogram by the application 50 at 210. Each event for the event log data may be windowed within a time slot, and events within a certain time window may be grouped into the same time slot. As a non-limiting example, there may be some events in a time slot by themselves. The granularity of the time slots may be designated in accordance with user preferences.

The occurrence of the events (e.g., what happened) is mapped to a y-axis of the pseudo spectrogram by the application 50, where the occurrence corresponds to the frequency axis of the pseudo spectrogram at 220. The occurrence of the event may relate to the subject or specific category of the event in the event log data. The category of an event relates to the nature of the event. Events of a like nature (category) may be grouped together. Also, the category of the event may be different from the categories of other events. As a non-limiting example, an individual event category can be defined in terms of the event identities that the event category contains in the format of an identity table, with a specific frequency attached. An event can therefore be quickly mapped into appropriate categories, and hence associated frequencies, by searching identity tables. If the nature of an event identity determines that it belongs to multiple categories, the event identity may be mapped onto multiple frequencies.

The strength of events may be mapped to a z-axis of the spectrum, where the z-axis is a magnitude axis, and where a magnitude value reflects the significance of the events happened at a particular time slot in a particular category by the application 50 at 230. As a non-limiting example, the event intensity or event magnitude of the event log data may correspond to a particular color and/or thickness of the lines of the pseudo spectrogram. Also, as a non-limiting example, the value of the number of events in a particular category within a particular time slot can be used as the event magnitude.

The pseudo spectrogram is presented as a graph on a display screen (such as the display 130) in time, frequency, and magnitude by the application 50 at 240. The sequential order of the events is presented in time on the x-axis of the pseudo spectrogram. The frequency of the events, which corresponds to the particular category that the events are grouped, is presented on the y-axis of the pseudo spectrogram. As a non-limiting example, there may be some categories that only include one event, while other categories may include many events.

The strength (intensity/magnitude) of the events for a category (from the z-axis) is presented to correspond with a line thickness of the graph and/or to correspond with a line color of the graph. The pseudo spectrogram is observed by a user to ascertain an initial identification of an overall status or an initial estimate of a problem area at 250. Although a technique of visually representing three-dimensional data on a two-dimensional display has been described in accordance with exemplary embodiments, it is understood that other techniques may be employed, such as a pseudo three-dimensional display (displaying a z-axis) or using color (instead of line thickness), which might be more appropriate for complex situations.

Further, the event log data (e.g., from the storage 120) may be raw data that has not been processed. The human visual system of the user processes the raw, unprocessed event log data presented in the spectrogram. In accordance with exemplary embodiments, the event log data may be voluminous and the application 50 maps the event log data to the pseudo spectrogram where a user can quickly observe the event log data to discover any anomalies in the data.

Additionally, the raw event log data may essentially be a time series of events. Such data is therefore one dimensional in its normal format and not suitable to be displayed to exploit human visual parallel processing power, for example, quick identification of event context. According to exemplary embodiments, however, converting one dimensional raw event log data into multi-dimensional facilitates human visual processing as discussed herein.

Additionally, the event log data mapped to the pseudo spectrum can be translated as audio via the application 50, so that a user (using the human auditory system) can hear and recognize anomalies in accordance with exemplary embodiments. The user may be able to identify a particular section (or event) of the event log data that requires further investigation.

Figure 3:
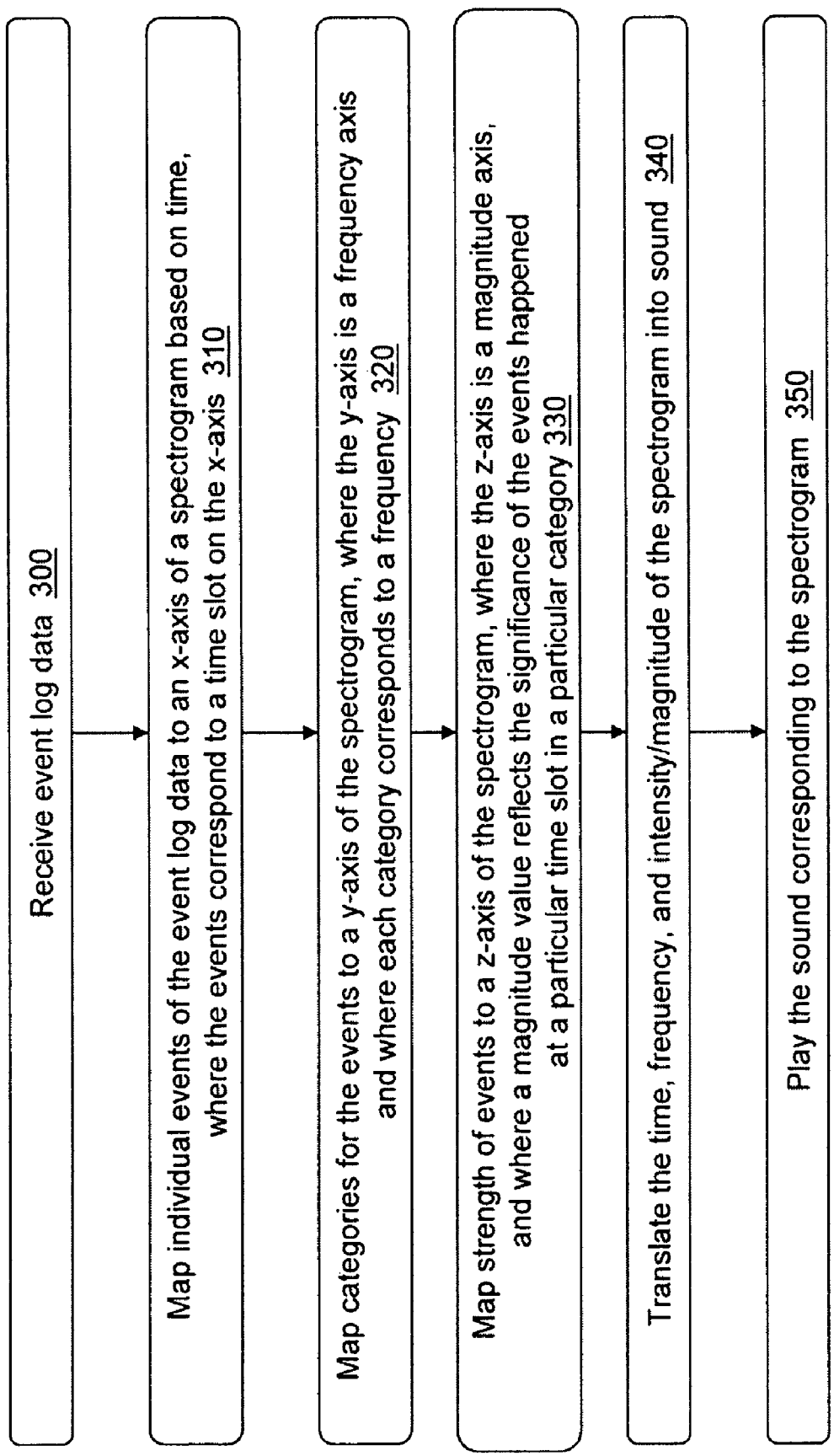
FIG. 3 illustrates a method for mapping trace data to sound in accordance with exemplary embodiments.

FIG. 3 illustrates a method of mapping trace data to sound in accordance with exemplary embodiments.

The application 50 may retrieve and/or receive event log data from the storage 120 at 300. The time for events of the event log data is mapped to an x-axis of a pseudo spectrum by the application 50 at 310. As discussed herein, each event for the event log data may be windowed within a time slot, and events within a certain time window may be grouped into the same time slot. The sound played from the pseudo spectrum is played in the order of the events mapped on the x-axis.

The occurrence of the events (e.g., what happened) is mapped to a y-axis of the pseudo spectrum by the application 50, where the occurrence corresponds to the frequency axis of the pseudo spectrum at 320. The occurrences may relate to categories of events, and each category of the events may be in accordance with the nature of the event. As a non-limiting example, an individual event category can be defined in terms of the event identities that the event category contains in the format of an identity table, with a specific frequency attached. An event can therefore be quickly mapped into appropriate categories, and hence associated frequencies, by searching the identity tables. If the nature of an event identity determines that the event identity belongs to multiple categories, the event identity may be mapped onto multiple frequencies.

The strength of events is mapped to a z-axis of the pseudo spectrum by the application 50 at 330. As a non-limiting example, the strength of events may be mapped to a z-axis of the spectrum, where the z-axis is a magnitude axis, and where a magnitude value reflects the significance of the events happened at a particular time slot in a particular category. During playback of the pseudo spectrum, the loudness of each event corresponds to the event intensity and/or event magnitude, which may be different from mapping the event intensity and/or event magnitude to, say, the line thickness of a graph for human visual processing. The strength of events or magnitude may be determined based on a particular application of exemplary embodiments. As a non-limiting example, an option may be that the magnitude of the spectrum at a particular time for a particular category is the sum of the magnitude values of all individual events in that time slot in the category, and more important events may be assigned a higher magnitude. Also, in accordance with exemplary embodiments, the magnitude should be treated as a relative value and can be modified for any given application as long as the relative magnitude value of events compared with any other magnitude values of events in the spectrum is preserved (e.g., the overall sound volume can be adjusted as desired). As a non-limiting example, a smaller magnitude for a more important individual event might be more appropriate for situations when "something is missing" is more detectable. Although non-limiting examples are described herein, it should be appreciated that providing the strength or magnitude for events is not meant to be limiting.

The application 50 translates the time, frequency, and intensity/magnitude of the pseudo spectrum into sound at 340. Also, in accordance with exemplary embodiments the audio module 30 may translate the time (x-axis), frequency (y-axis), and intensity/magnitude (z-axis) of the pseudo spectrum into sound. Further, the time from the x-axis, the multiple frequencies from the y-axis, and the magnitude (strength) from the z-axis may be translated into sound by adopting any existing appropriate technologies. The sound corresponding to the pseudo spectrum for the event log data is played by the application 50 via the audio module 30 for the user to ascertain an initial identification of an overall status or an initial estimate of a problem area at 350. The sound may be heard on the audio system 140.

The frequency corresponding to the events, which corresponds to the particular category that the events are grouped, may utilize a predetermined frequency band. As a non-limiting example, one category of events may be assigned a first frequency band, a second category of events may be assigned a second frequency band, a third category of events may be assigned a third frequency band, and so forth. The frequencies can continue to be assigned until all of the events (categories) of the event log data are accounted for. As a note, the various frequencies that are assigned to the events of the event log data should correspond to the audible range of frequencies for humans. The event log data may be played for each frequency at the proper time and loudness via the application 50 and the audio module 40.

As discussed herein, the event log data may be volumes of raw data that have not been processed. Additionally, the user may simultaneously watch and hear the event log data to ascertain any possible problems. In accordance with exemplary embodiments, the user (utilizing the human visual and/or auditory system) may not have to understand (at least fully understand) the technical aspects of the event log data being observed. As a non-limiting example, the user may need to only recognize anomalies and/or potential errors in the event log data. In non-limiting examples, the user may watch or listen to the pseudo spectrum and determine that there are not any recognizable problems.

Further, in using the spectrum for problem detection, the user may need to be trained to recognize normal and/or problematic execution spectrogram/sound patterns. As a non-limiting example, a normal execution spectrum should contain a dominant low frequency component at start up, indicting initialization activities, followed by a dominant high frequency, indicating a working state. A spectrum lacking the dominant high frequency may indicate initialization problem. Also, it is understood that non-limiting examples have been provided for illustrative purposes only and are not meant to be limiting.

Figure 4:
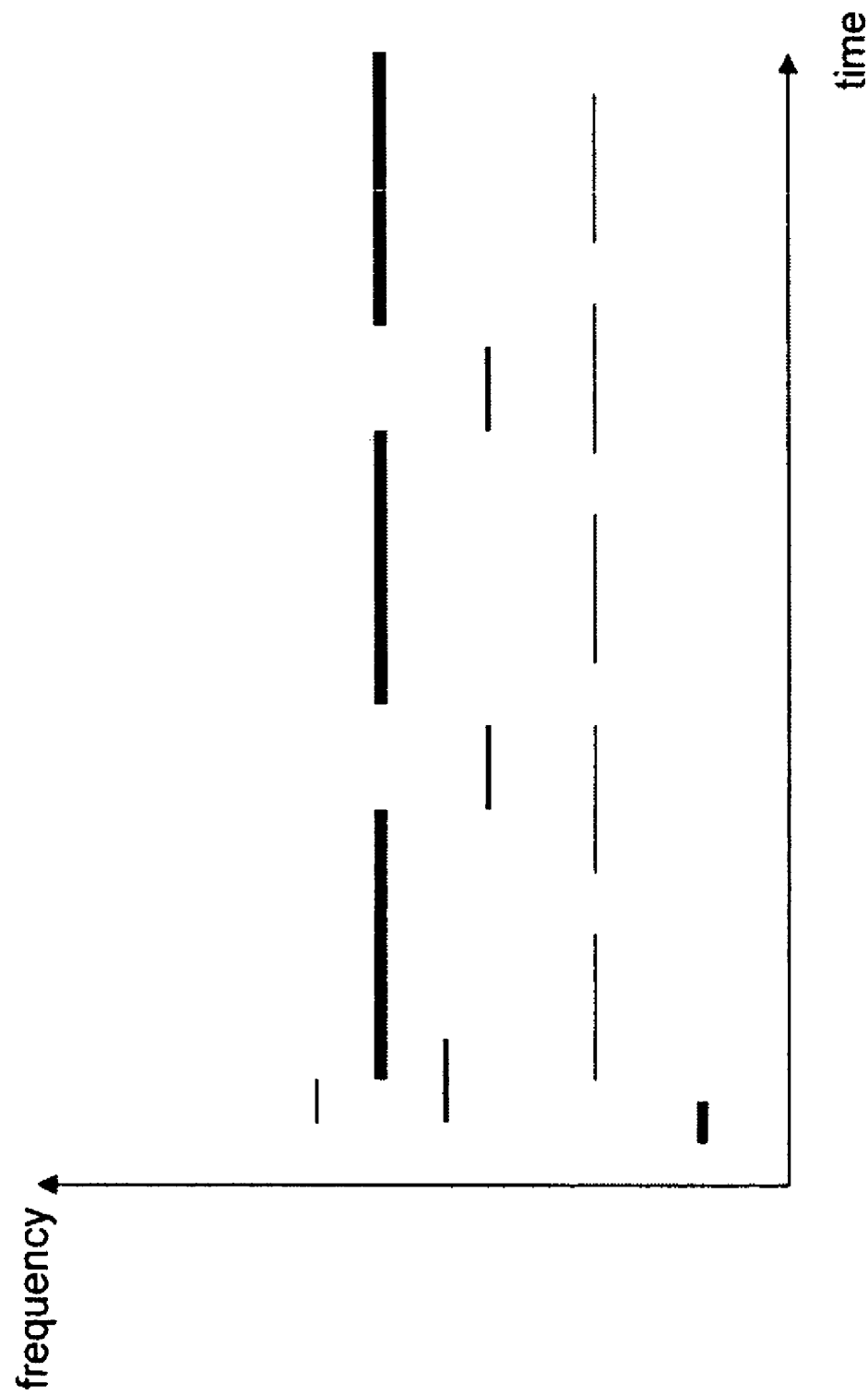
FIG. 4 illustrates one example of a spectrogram in accordance with exemplary embodiments.

FIG. 4 illustrates a non-limiting example of event log data provided in a pseudo spectrogram in accordance with exemplary embodiments. FIG. 4 illustrates a spectrum having an x-axis and a y-axis. The frequency each event of the event log data has been mapped to the y-axis, and the time slot of each event has been mapped to the x-axis.

Additionally, the functions and capabilities of a spectrograph for creating a sound spectrum and/or a graphical spectrogram may be incorporated in the computer system 110 in accordance with exemplary embodiments. Those skilled in the related art understand the functions and capabilities of a spectrograph.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for utilizing the human perceptual system by providing a spectrogram of event log data for viewing, comprising:
receiving by a computer event log data;
mapping by the computer events of the event log data to an x-axis of a spectrogram based on time, wherein events of the event log data correspond to a time slot on the x-axis;
mapping by the computer categories for the events to a y-axis of the spectrogram, wherein the y-axis is a frequency axis, and wherein each of the categories respectively corresponds to a frequency of a plurality of frequencies;
mapping by the computer strength of the events to a z-axis of the spectrum, wherein the z-axis is a magnitude axis, wherein a magnitude value reflects a significance of the events at each time slot for the categories, and wherein the magnitude value for the events is mapped to a line thickness of the spectrum for the plurality of frequencies; and
presenting by the computer the spectrogram of the event log data in a two-dimensional graphical format in time, frequency, and magnitude for observation by a user.

2. The method of claim 1, wherein the event log data is raw, unprocessed event log data that is mapped to the spectrogram.

3. The method of claim 1, wherein the magnitude value for events corresponds to colors on the spectrogram.

4. The method of claim 1, wherein events of a same category are mapped to a same frequency band of the plurality of frequencies.

* * * * *